US006351564B1

(12) United States Patent
Martin

(10) Patent No.: US 6,351,564 B1
(45) Date of Patent: Feb. 26, 2002

(54) METHOD OF SWITCHING OF CODED VIDEO SEQUENCES AND CORRESPONDING DEVICE

(75) Inventor: François Martin, Chenneviere-sur-Marne (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/244,841

(22) Filed: Feb. 2, 1999

(30) Foreign Application Priority Data

Feb. 3, 1998 (EP) .............................. 98400223
Jul. 28, 1998 (EP) .............................. 98401929

(51) Int. Cl.$^7$ ................................ G06K 5/46
(52) U.S. Cl. ................... 382/233; 382/236; 375/240.25
(58) Field of Search .................. 375/240.02–240.07, 375/240.25–240.28, 240.12–240.16, 240.27; 382/233, 236; 709/204; 348/512; 386/111, 109

(56) References Cited

U.S. PATENT DOCUMENTS

| | | | | |
|---|---|---|---|---|
| 5,913,031 A | * | 6/1999 | Blanchard | 709/204 |
| 6,011,598 A | * | 1/2000 | Tsuji et al. | 375/240.26 |
| 6,072,831 A | * | 6/2000 | Chen | 375/240.03 |
| 6,154,494 A | * | 11/2000 | Blanchard | 375/240.23 |
| 6,160,915 A | * | 12/2000 | Kato et al. | 382/232 |

FOREIGN PATENT DOCUMENTS

| | | |
|---|---|---|
| EP | 062911 A2 | 1/1996 |
| EP | 0711077 A2 | 5/1996 |
| EP | 0755157 A2 | 1/1997 |
| FR | 974011603 | 5/1997 |
| WO | 9708898 A1 | 3/1997 |

OTHER PUBLICATIONS

"MPEG Video Coding: A Basic Tutorial Introduction", by S.R. Ely, Research and Development Report BBC RD Mar. 1993, pp. 1–10.

* cited by examiner

Primary Examiner—Leo Boudreau
Assistant Examiner—Ishrat Sherali
(74) Attorney, Agent, or Firm—Russell Gross

(57) ABSTRACT

The invention relates, in a video decoder, to a method of switching from a first to a second coded video sequence when the second bit rate is lower than the first one. If the time spent in the decoders buffer by the first bit of the first transmitted picture of the second sequence that has to be decoded, also called vbv_delay, is greater -and therefore not compatible with—than the similar period for the first bit of the first replaced picture of the first sequence, it is then reduced by giving to the bitrate of said first transmitted picture an increased value, in order to obtain the compatibility of the vbv_delays. In case of a limited bandwidth for the bit rates, this reduction operation is successively repeated for as many following pictures as necessary.

5 Claims, 8 Drawing Sheets

METHOD OF SWITCHING OF CODED VIDEO SEQUENCES AND CORRESPONDING DEVICE

FIELD OF THE INVENTION

The present invention relates, in a video decoder provided with a buffer for receiving pictures to be decoded, to a method of switching, before decoding, from a first coded picture sequence at a bit rate $R_{old}$ to a second one at a lower bitrate $R_{new}$ and to a corresponding device for implementing said switching method.

BACKGROUND OF THE INVENTION

As described for instance in the document "MPEG video coding: a basic tutorial introduction", BBC report RD 1996/3, an MPEG-type compressed video sequence is subdivided into groups of pictures (or GOPs), that themselves include different types of coded pictures (an example of GOP is described in FIG. 1):

- intra-coded pictures (I-pictures), that are coded without any reference to other pictures;
- predictive-coded pictures (P-pictures), that are coded using prediction from a past reference;
- bidirectionally predictive-coded pictures (B-pictures), that are coded using prediction from past and/or future reference(s) (the arrows indicate for each P-picture or B-picture the respective reference picture(s)).

According to the different types of prediction, pictures are coded with more or less efficiency, and the resulting number of bits is not constant. Moreover, as a picture is assumed, according to the MPEG specifications, to be instantaneously decoded every picture period $T_v$, the first bit of the coded pictures does not spend the same time in the decoder's buffer: this variable time, defined in the MPEG syntax, is called the vbv_delay (vbv=video buffering verifier). An example of decoder's buffer fullness for a stream coded at a constant bit rate and where a picture is instantaneously decoded every picture period $T_v$ is shown in FIG. 2 (decoder's buffer fullness S(t) versus time t) for successive pictures $I_0$ to $I_4$ with respective vbv_delays $vbv(I_0)$, $vbv(I_1), \ldots, vbv(I_4), \ldots$, etc. The bit rate for a picture is given by the slope, and the fullness (or decoder's buffer state) is given by the highest point for each period $T_v$. According to FIG. 3, the size d(Ij) of a picture Ij decoded at the time $t_d(Ij)$ when Ij is removed from the decoder buffer is equal to:

$$d(Ij) = S^-(Ij) - S^+(Ij) \quad (1)$$

with $S^-(Ij)$ and $S^+(Ij)$ designating respectively the decoder's buffer state at time $t_d^-(Ij)$ (=the time just before the picture Ij is removed from decoder's buffer) and at time $t_d^+(Ij)$ (=the time just after the picture Ij is removed from decoder's buffer). For this picture Ij, the relation between its vbv_delay vbv(Ij), the bit rate R of the video stream and the decoder's buffer state $S^-(Ij)$ is given by:

$$S^-(Ij) = vbv(Ij) \cdot R \quad (2)$$

One has also:

$$S^+(Ij) = S^{-(Ij+1)} - R \cdot T_v \quad (3)$$

From relations (2), (1), (3), it can be deduced a more precise relation giving (in bits) the size d(Ij) of the decoded picture Ij:

$$d(Ij) = R \cdot (vbv(Ij) - vbv(Ij+1) + T_v) \quad (4)$$

Due to this regulation model, a simple switch between two compressed (coded) video sequences is not always possible: performing a switch with a picture decoded at every period $T_v$ is not possible when the vbv_delay of the first new picture that is transmitted is greater than the vbv delay of the first old picture that is replaced. This situation is illustrated in FIG. 4 it is not possible to replace the picture $O_3$ of the old sequence $(O_1, O_2, O_3)$ by the picture $N_1$ of the new sequence $(N_1, N_2)$, since the vbv_delay vbv(N1) of $N_1$ is greater than the vbv_delay $vbv(O_3)$ of $O_3$.

It is known, in MPEG-2 standard (such as described for instance in the european patent application EP 0692911), that video switching is then facilitated by the use of special access points called "splicing points": it can be performed only if same splicing points are present on both old and new video sequences.

SUMMARY OF THE INVENTION

It is an object of the invention to propose a method that allows video sequence switching without the constraints of splicing point creation.

To this end the invention relates to a method such as described in the preamble of the description and which is moreover characterized in that, if the period $vbv(N_1)$ that the first bit of the first transmitted picture $(N_1)$ of the second sequence would have to spend in the decoder's buffer before the decoding time of said first transmitted picture is greater than the similar period $vbv(O_3)$ that the first bit of the first replaced picture $(O_3)$ of the first sequence would have to spend in said buffer before its own decoding time, then the bitrate of said first transmitted picture of the second sequence is increased, at least up to the value $R_{int}$ for which said period $vbv(N_1)$ is correspondingly reduced to a value at most equal to the period $vbv(O_3)$.

Switch can now be performed without any splicing point. According to the present invention, the bit rate is locally increased in such a manner that vbv_delays of the first old picture that is replaced and the first new picture that is transmitted are now compatible, and therefore that a splicing point is no longer needed in order to implement the switching operation.

However, it is not always possible to increase the bitrate indefinitely to reach a suitable vbv_delay value: for instance, the video sequences may be multiplexed with other elementary streams to form a multiplex transport stream, and the method described hereabove may be limited, in that case, by the available bandwidth in said multiplex transport stream.

According to the invention, the above-described method is then improved in that, in case of a limited bandwidth for the bitrates:

(a) the bit rate of said first transmitted picture $N_1$ is increased up to the lower of the two following values: the maximum bit rate value corresponding to said limited bandwidth, or the value $R_{int}$ for which said period $vbv(N_1)$ is correspondingly reduced to a value at most equal to the period $vbv(O_3)$;

(b) the operation (a) is repeated for the second picture $N_2$ of the second sequence, only if said lower value is the maximum bit rate value corresponding to said limited bandwidth;

(c) the operation (a) is similarly repeated for the following pictures $N_3, N_4, \ldots$, of the second sequence, only if said lower value at the end of the previous operation is said maximum bit rate value.

When there is a bandwidth limitation for the bit rate increase, the proposed method is improved by increasing successively the bit rates for as many pictures of the second sequence as necessary, in a way to reduce as much as possible the vbv_delay of the first picture in spite of the constraint due to said bandwidth limitation.

BRIEF DESCRIPTION OF THE DRAWINGS

The particularities and advantages of the invention will now be apparent from the following description and the accompanying drawings, in which.

DETAILED DESCRIPTION OF THE INVENTION

Figure 1:
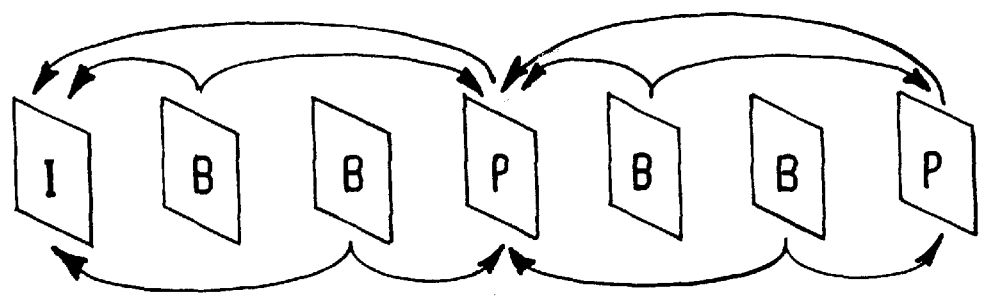
FIG. 1 shows an example of GOP including different types of coded pictures.
Figure 2:
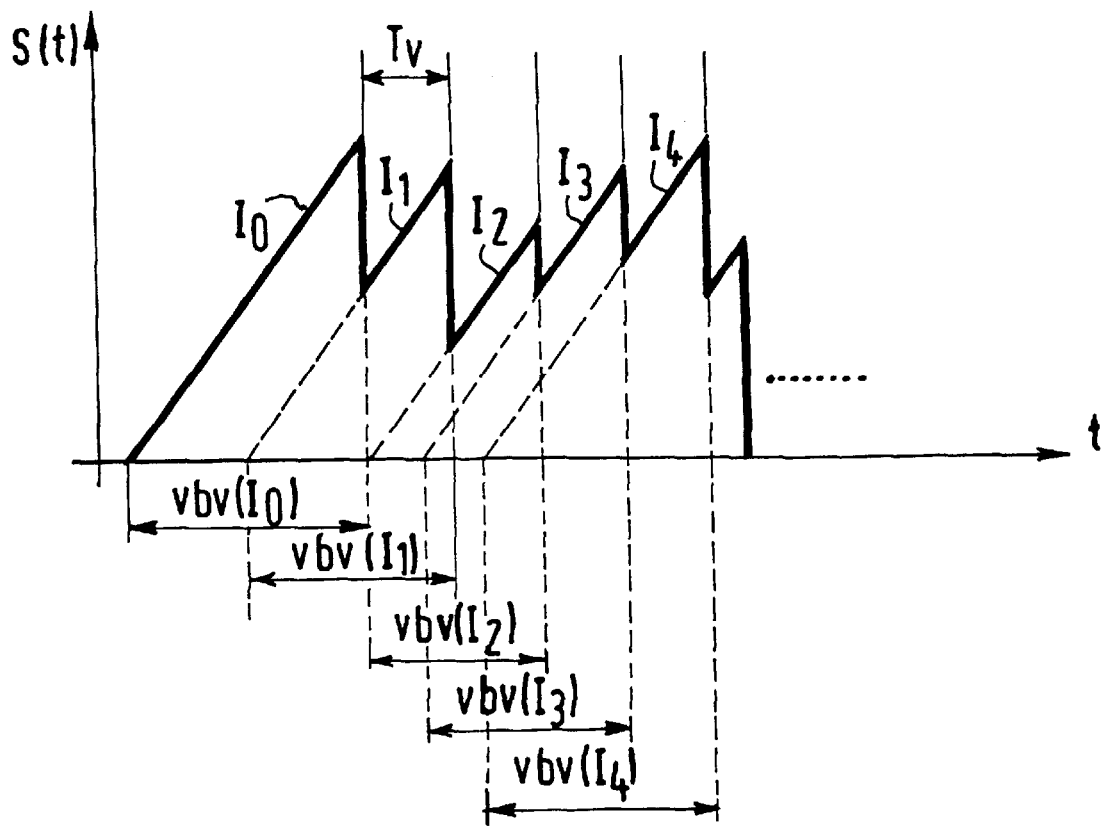
FIG. 2 gives an example of decoder's buffer fullness versus time, for a stream coded at a constant bit rate and where a picture is instantaneously decoded at regular times.
Figure 3:
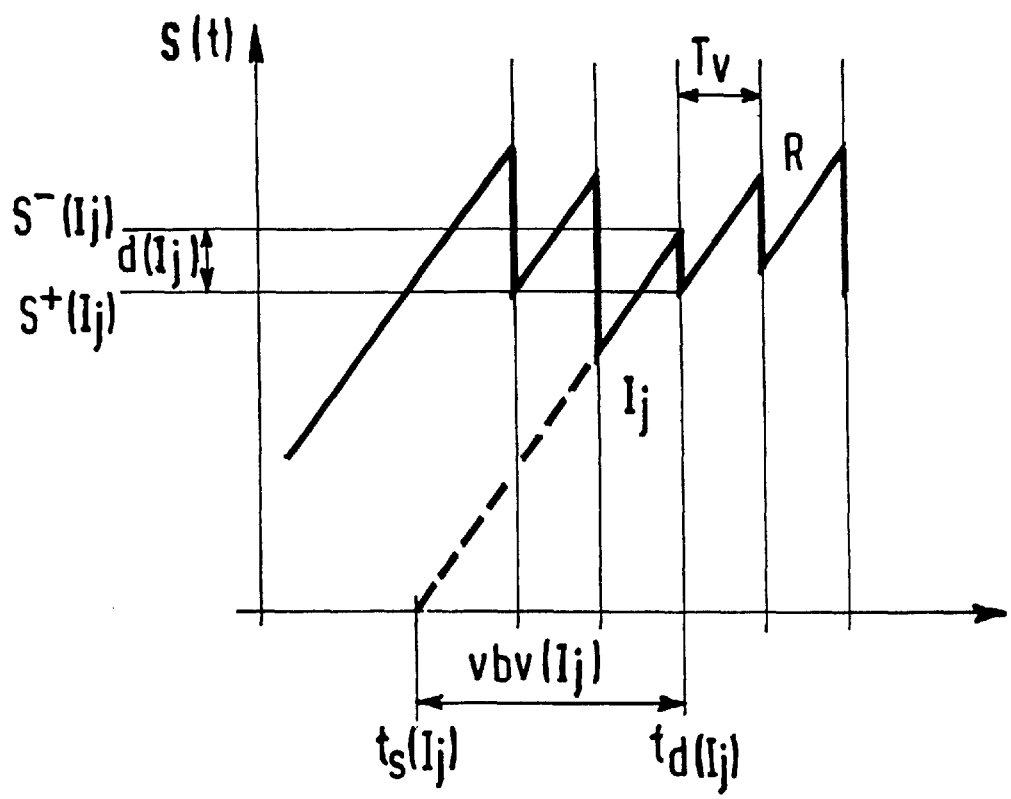
FIG. 3 allows to identify the main useful parameters of a picture Ij when using the decoder's buffer fullness representation of FIG. 2.
Figure 4:
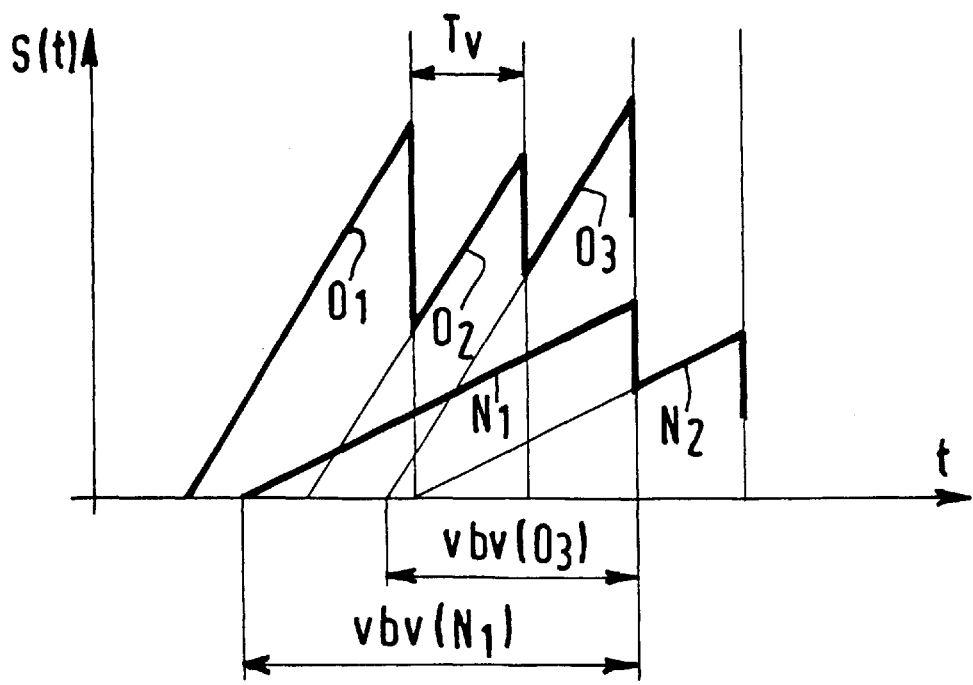
FIG. 4 illustrates a situation where a switch between an old sequence and a new one is not possible.

The present invention relates to a method of switching from a first coded picture sequence at a bit rate $R_{old}$ to a second one at a lower bitrate $R_{new}$ in a video decoder provided with a buffer for receiving pictures to be decoded, and to a corresponding device for implementing the method. The principle of the invention is to locally increase, at the transition, the bit rate of the new sequence, which leads to a reduction of $vbv(N_1)$ to a value at most equal to (this value is then designated by (vbv' $(N_1)$, or even lower, than $vbv(O_3)$: the switch is now possible. This situation corresponds to FIG. 5, that illustrates how the vbv_delays of $N_1$ and $O_3$ (in comparison with FIG. 4) are now compatible after the bit rate modification concerning $N_1$. The global decoder's buffer evolution after replacing the picture $O_3$ by the picture $N_1$ is illustrated in FIG. 6, that shows the stream obtained when the switch is made according to the principle of the invention.

From the relation (2), it can be deduced that:

$$R_{int}=(vbv(N_1).R_{new})/vbv(O_3) \quad (5)$$

knowing that:

$R_{new}$=bit rate of the new video sequence $R_{int}$=intermediate bit rate when the method according to the invention is implemented.

Figure 5:
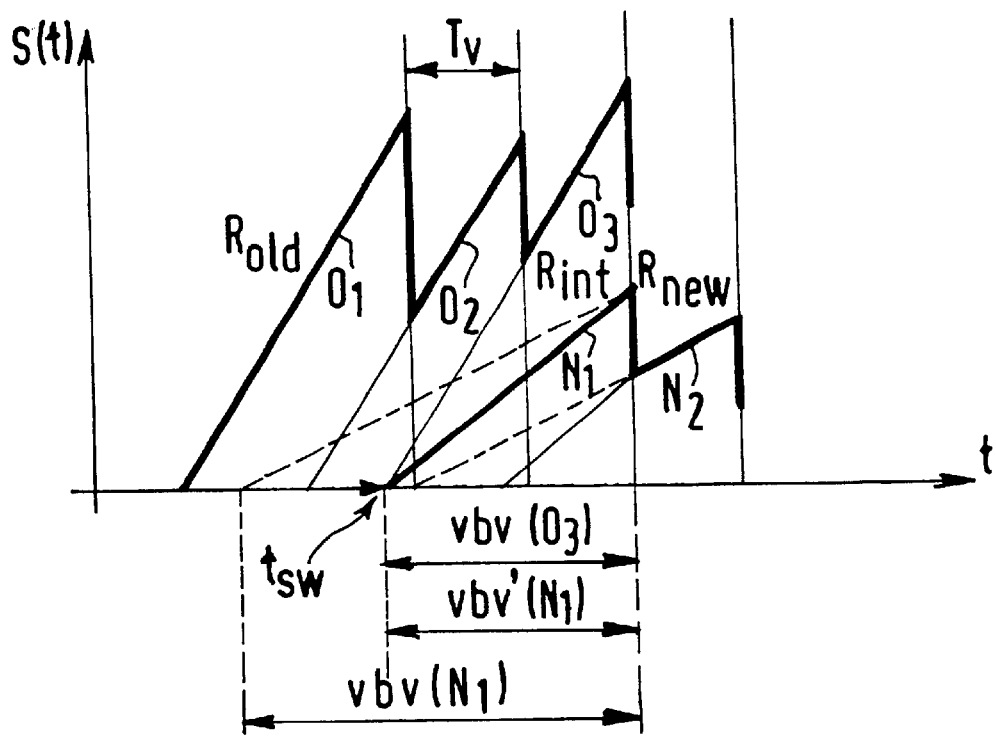
FIG. 5 illustrates the principle of the method according to the invention.
Figure 6:
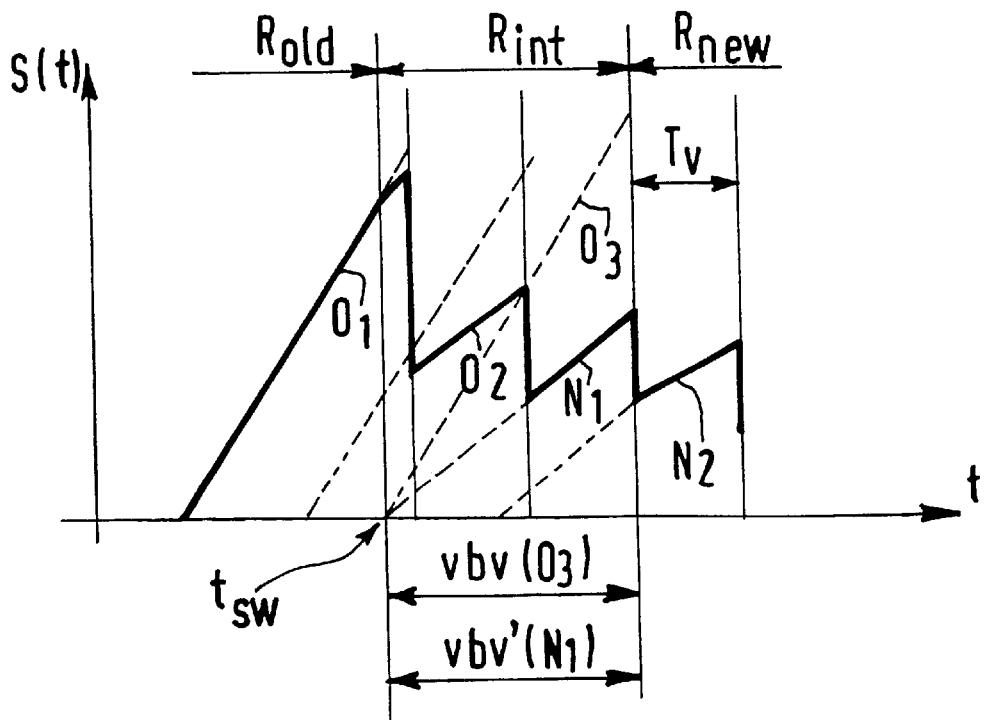
FIG. 6 shows the resulting stream if the switch is made according to said principle.

As can be seen in FIG. 5, the intermediate bit rate $R_{int}$ is applied to the stream as soon as the switch is requested, i.e. at the time $t_{sw}$ when the first bit of the new picture $N_1$ enters the decoder's buffer ($R_{old}$ designates the bit rate of the old video sequence). As seen in FIG. 6, at this time $t_{sw}$ the picture $O_1$ is not yet decoded and its last bits will be introduced in the decoder's buffer at the intermediate rate $R_{int}$. When this picture $O_1$ is decoded, the last bits of the picture $O_2$ are not completely introduced in the decoder's buffer and this introduction is also done at $R_{int}$. When $O_2$ is decoded, similarly the last bits of $N_1$ (that replaces $O_3$) are not yet completely introduced in the decoder's buffer and this introduction is still done at $R_{int}$. When $N_1$ is decoded, all the subsequent vbv_delays (of $N_2$, etc . . . ) are compatible, and the bit rate for the introduction of the following pictures ($N_2$, etc . . . ) is now the bit rate $R_{new}$ of the new video sequence.

The invention is not limited to the implementation described above, from which modifications can be deduced without departing from the scope of the invention. For instance, if the intermediate bit rate $R_{int}$ becomes higher than the old bit rate $R_{old}$, care must be taken that no overflow will appear at the transition.

Figure 7:
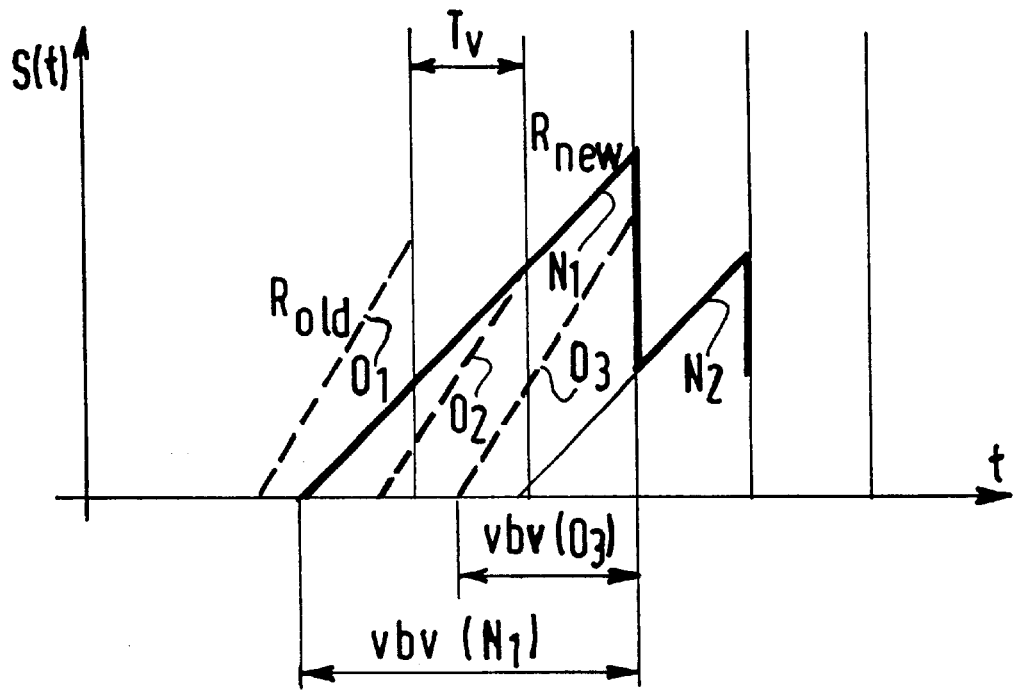
FIGS. 7 and 8 illustrate a limitation of the method according to the invention: the switch problem, that can be observed in FIG. 7, is not completely solved by the implementation of the invention as shown in FIG. 8.
Figure 8:
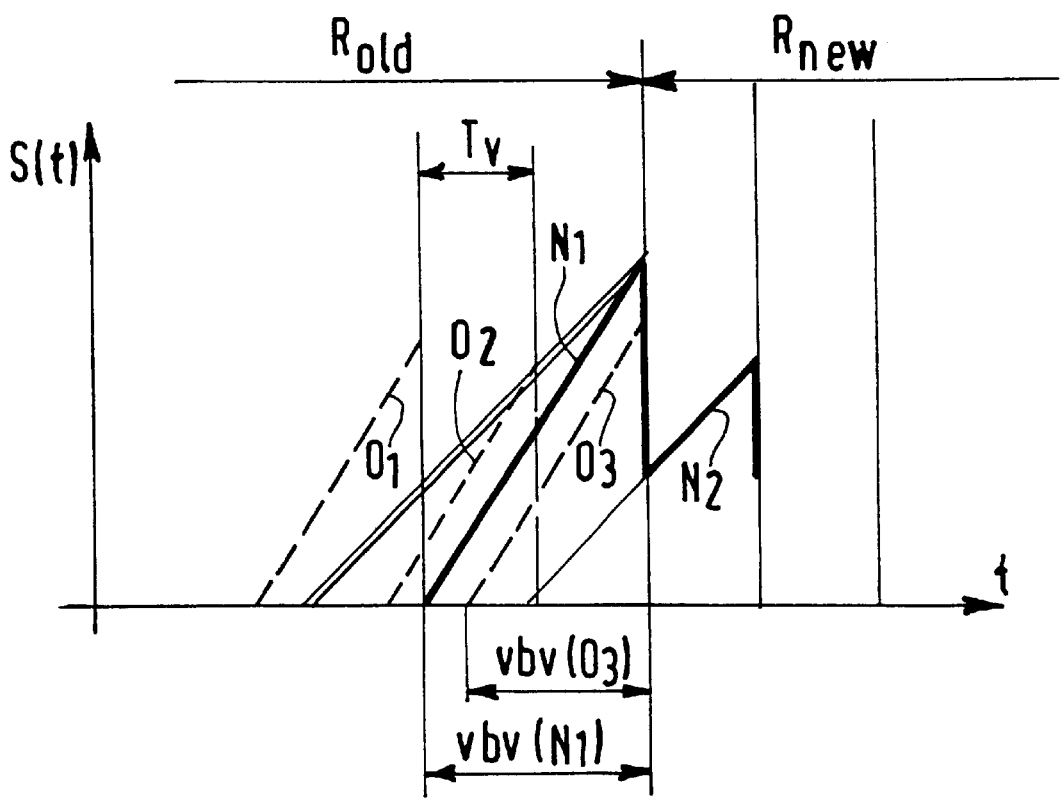

Secondly it is not always possible to increase the bit rate of $N_1$ indefinitely to reach a suitable vbv_delay value; generally the video sequences are multiplexed with other elementary streams to form a multiplex transport stream, and the method of performing a local bit rate modification may be limited in that case by the available bandwidth in said multiplex transport stream. FIGS. 7 and 8 illustrate respectively the switch problem (when $vbv(N_1)$ is greater than $vbv(O_3)$, the switching operation cannot be performed) and an implementation of the switching method such as previously described: $vbv(N_1)$ has decreased by means of an increase of the bit rate of the first transmitted picture $N_1$ of the new sequence. In the case where the available bandwidth is limited, the increase of bit rate of $N_1$ is not sufficient to have for $vbv(N_1)$ a value compatible with $vbv(O_3)$. For a reason of simplicity of the figures, the bit rate of the old sequence $R_{old}$ is here assumed to correspond to the bandwidth limit for the increase of $R_{new}$ (for the picture $N_1$). As depicted in FIG. 8, the value $vbv(N_1)$ after the bit rate of $N_1$ has increased up to a value equal to the bit rate corresponding to $O_3$ is indeed still greater than $vbv(O_3)$ (in that figure and in the following FIGS. 9 and 11, the double line corresponds to the picture $N_1$ before the modification of the bit rate of said picture $N_1$).

Figure 9:
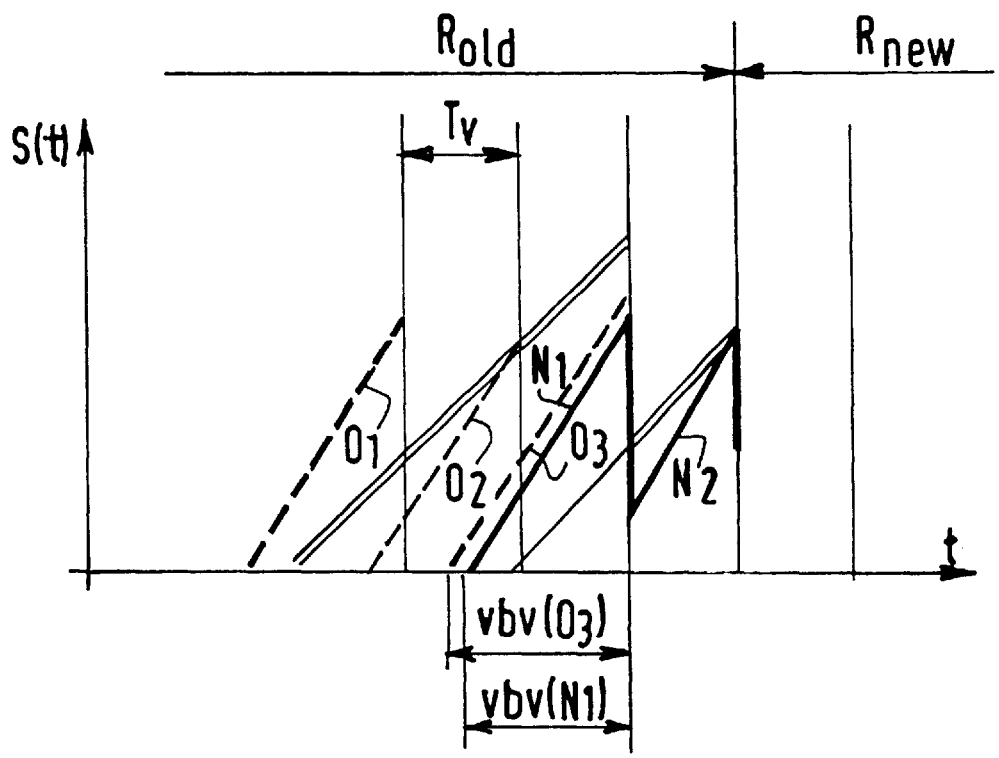
FIG. 9 illustrates the principle of the improved method according to the invention, allowing to solve said limitation.

As it can then be seen in FIG. 9, when propagating—according to the invention-the increase of bit rate to the following picture $N_2$ of the new sequence, the decoder's buffer is partly emptied and $vbv(N_1)$ decreases once more, but, this time, of a quantity that is sufficient to make vbv_delays of $N_1$ and $O_3$ compatible. More generally, it may be proposed, if necessary (i.e. if said quantity is however not sufficient to make vbv_delays of $N_1$ and $O_3$ compatible), to increase the bit rate not only on the first, and then on the second new picture, but also successively on each of the following pictures, to a sufficient extent to obtain said compatibility of the vbv_delays.

Said generalization may be more precisely studied, and a computation of new buffer states and vbv_delays after such a generalized bit rate modification may be proposed. For that study, it is assumed that:

(a) all the notations of variables with index "b" indicate the variables before bit rate modification;

(b) all the notations of variables with index "a" indicate the variables after bit rate modification;

(c) since the implementation of the invention only relates to the new stream, which is independent of the pictures of the old stream, all the notations that consider an image $N_k$ of the new sequence will be resumed to the index k of this image;

(d) decoded times $t_d(k)$ and picture sizes $d(k)$ are not modified during the process.

The other used notations not still explained are the following:

- $t_S(I)$=time when the first bit of the picture I enters the decoder buffer;
- $t_{sa}(1), \ldots, t_{sa}(i), \ldots, t_{sa}(n)$=the times similar to $t_S(I)$, but after bit rate modification, for pictures $1, \ldots, i, \ldots, n$ of the new sequence;
- $d(1), \ldots, d(i), \ldots, d(n)$=size in bits of pictures $1, \ldots, i, \ldots, n$.

It is considered that the bit rate modification is made until the decoding of picture n (consideration on how deep must be the value of n will be presented later). Thus, for time t between $t_{sa}(1)$ to $t_d(n)$, the bit rate is equal to $R_{old}$ and, for time t higher than $t_d(n)$, the bit rate is equal to $R_{new}$. After $t_d(n)$, the buffer fullness does not change: $S^-_a(k)=S^-_b(k)$ and $S^+_a(k)=S^+_b(k)$ for k>n. The buffer state at time $t_d^-(n)$ is $S^-_b(n)$. The new buffer state at time $t^-_d(n-1)$ can then be deduced:

$$S^-_a(n-1)=S^+_b(n)-R_{old}.T_v+d(n-1) \quad (6)$$

Moreover:

$$S^-_b(n-1)=S^-_b(n)-R_{new}.T_v+d(n-1) \quad (7)$$

Thus it may be deduced that:

$$S^-_a(n-1)=S^-_b(n-1)-(R_{old}-R_{new}).T_v \quad (8)$$

In the same way one can show that:

$$S^-_a(n-2)=S^-_b(n-2)-(R_{old}-R_{new}).2T_v \quad (9)$$

and recursively that:

$$S^-_a(n-k)=S^-_b(n-k)-(R_{old}-R_{new}).kT_v \text{ for k in } [0,\ldots,n-1] \quad (10)$$

In the same way, it can be shown that:

$$S^+_a(n-k)=S^+_b(n-k)-(R_{old}-R_{new}).kT_v \text{ for k in } [0,\ldots,n-1] \quad (11)$$

New vbv_delays can also be computed:

$$vbv_a(n-k)=S^-_a(n-k)/R_{old} \text{ for k in } [0,\ldots,n-1] \quad (12)$$

From equation (10) it is deduced that:

$$vbv_a(n-k)=(S^-_b(n-k)/R_{new}).(R_{new}/R_{old})-kT_v.(1-R_{new}/R_{old}) \text{ for k in}=[0,\ldots,n-1] \quad (13)$$

Thus:

$$vbv_a(n-k)=vbv_b(n-k).(R_{new}/R_{old})-kT_v.(1-R_{new}/R_{old}) \text{ for k in } [0,\ldots,n-1]. \quad (14)$$

It must be noted, from equations (10) and (11), that the original buffer fullness is lower after a local bit rate increase, since $R_{old}$ is higher than $R_{new}$. Thus, if no care is taken, underflow can occur. The condition of non underflow will determine how deep can be the value of n.

To have a compliant buffer fullness after local bit rate increase, it is needed to have:

$$S^+_a(n-k)>0 \text{ for } k=[0,\ldots,n-1] \quad (15)$$

Due to equation (11), this leads to:

$$S^+_b(n-k)>T_v.(R_{old}-R_{new}) \text{ for k in } [0,\ldots,n-1] \quad (16)$$

The condition can also be expressed on vbv_delays. Buffer fullness does not underflow if:

$$vbv_b(n-k)>T_v \text{ for k in } [0,\ldots,n-1] \quad (17)$$

Due to equation (14), this leads to:

$$vbv_a(n-k)>T_v.(R_{old}-R_{new}+k.(R_{old}/R_{new}-1)) \text{ for } k=[0,\ldots,n-1] \quad (18)$$

If there is no problem of underflow, the minimal possible vbv_delay $d(1)/R_{old}$ will be reached.

Figure 10:
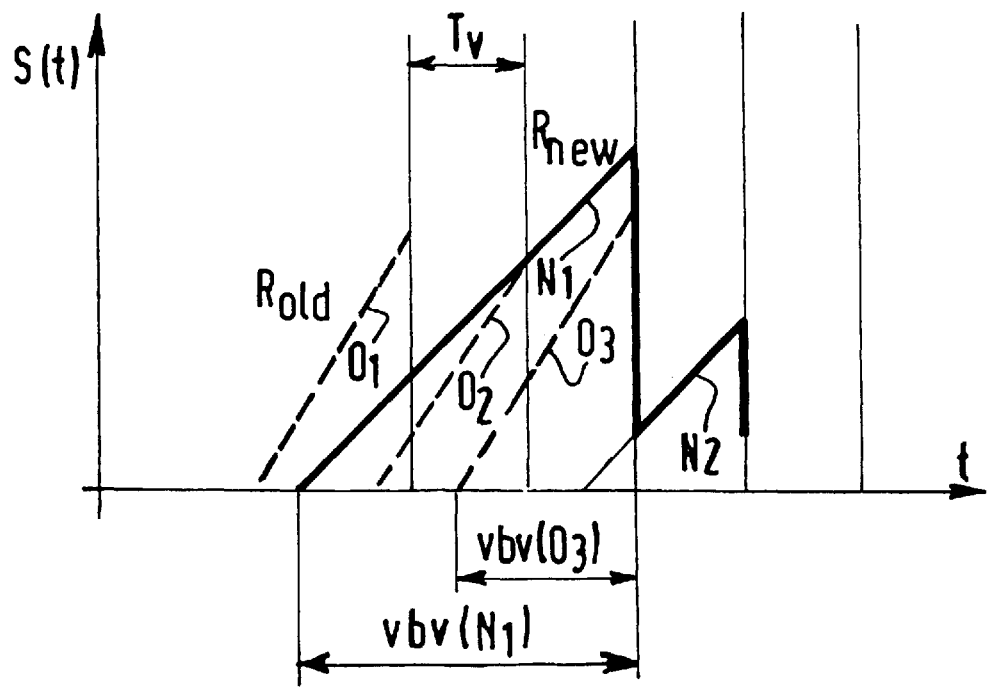
FIGS. 10 to 12 illustrate a situation where underflow occurs.
Figure 11:
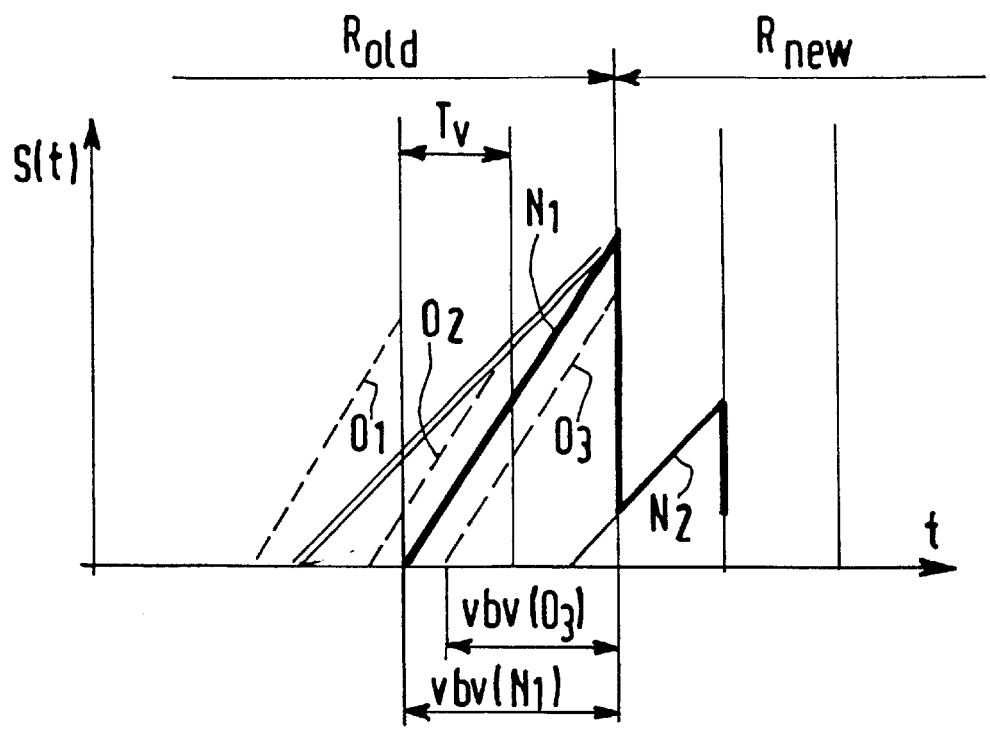
Figure 12:
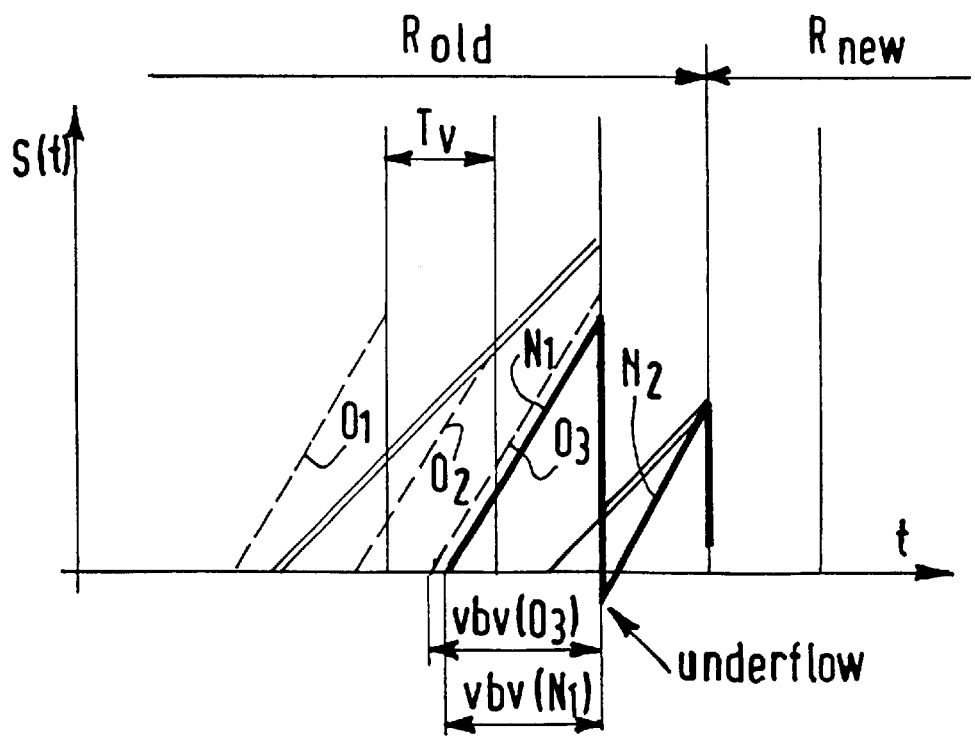

FIGS. 10 to 12 show an example of a situation where underflow occurs if n=2: FIG. 10 represents the original stream, FIG. 11 shows the increase of bit rate until the decoding of picture $N_1$, and FIG. 12 shows the increase of bit rate until the decoding of picture $N_2$ (as previously, the double lines correspond to the pictures $N_1$, $N_2$ before the modification of the bit rate of these pictures). In this last case, underflow occurs, while it does not if the bit rate is increased only until the decoding of $N_1$. That is finally this condition of non underflow that will determine the number of pictures of the new sequence for which the bit rate may be increased without any problem.

Figure 13:
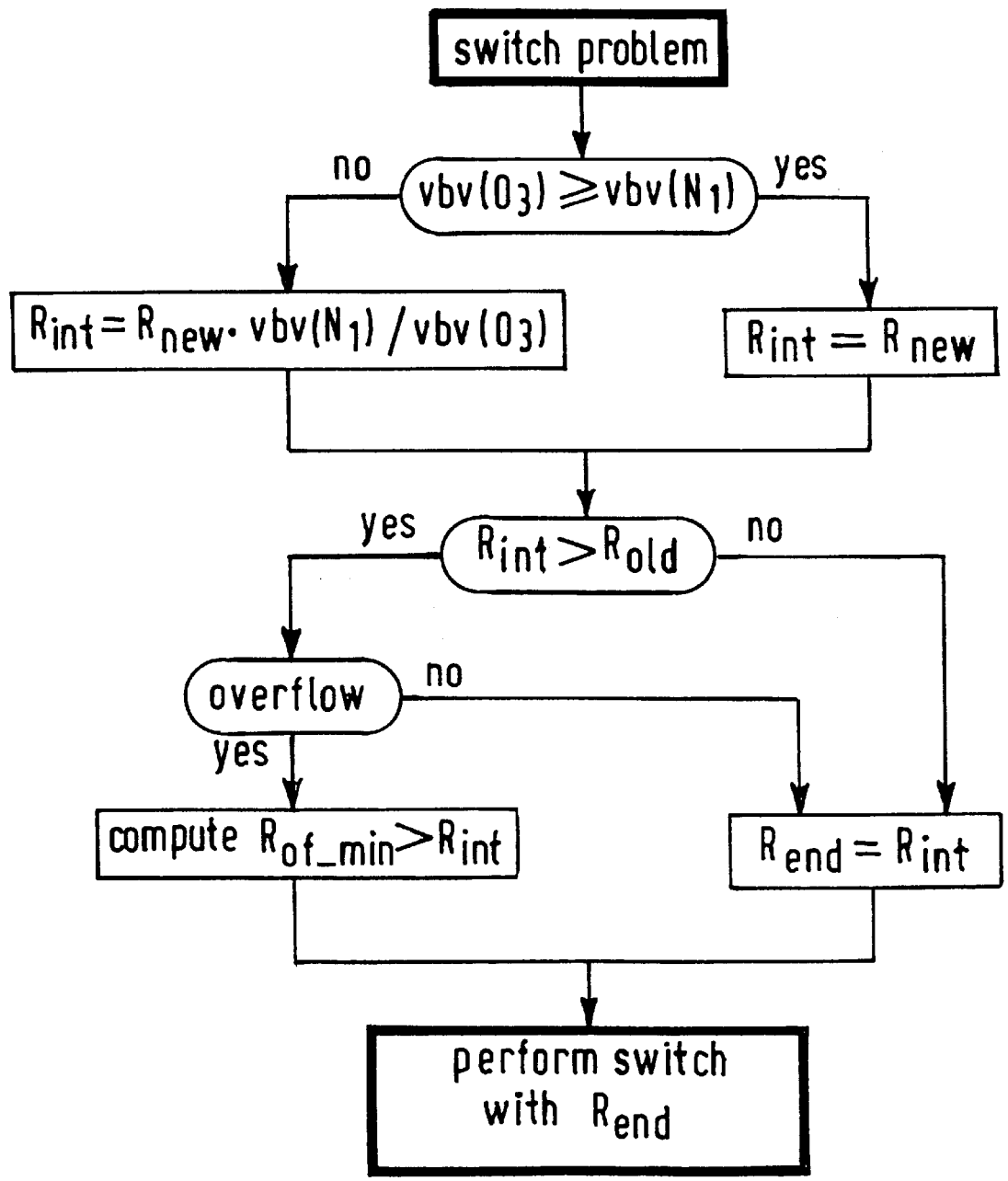
FIGS. 13 and 14 illustrate respectively the steps carried out in a switching device for implementing the described method and in another embodiment of said device.
Figure 14:
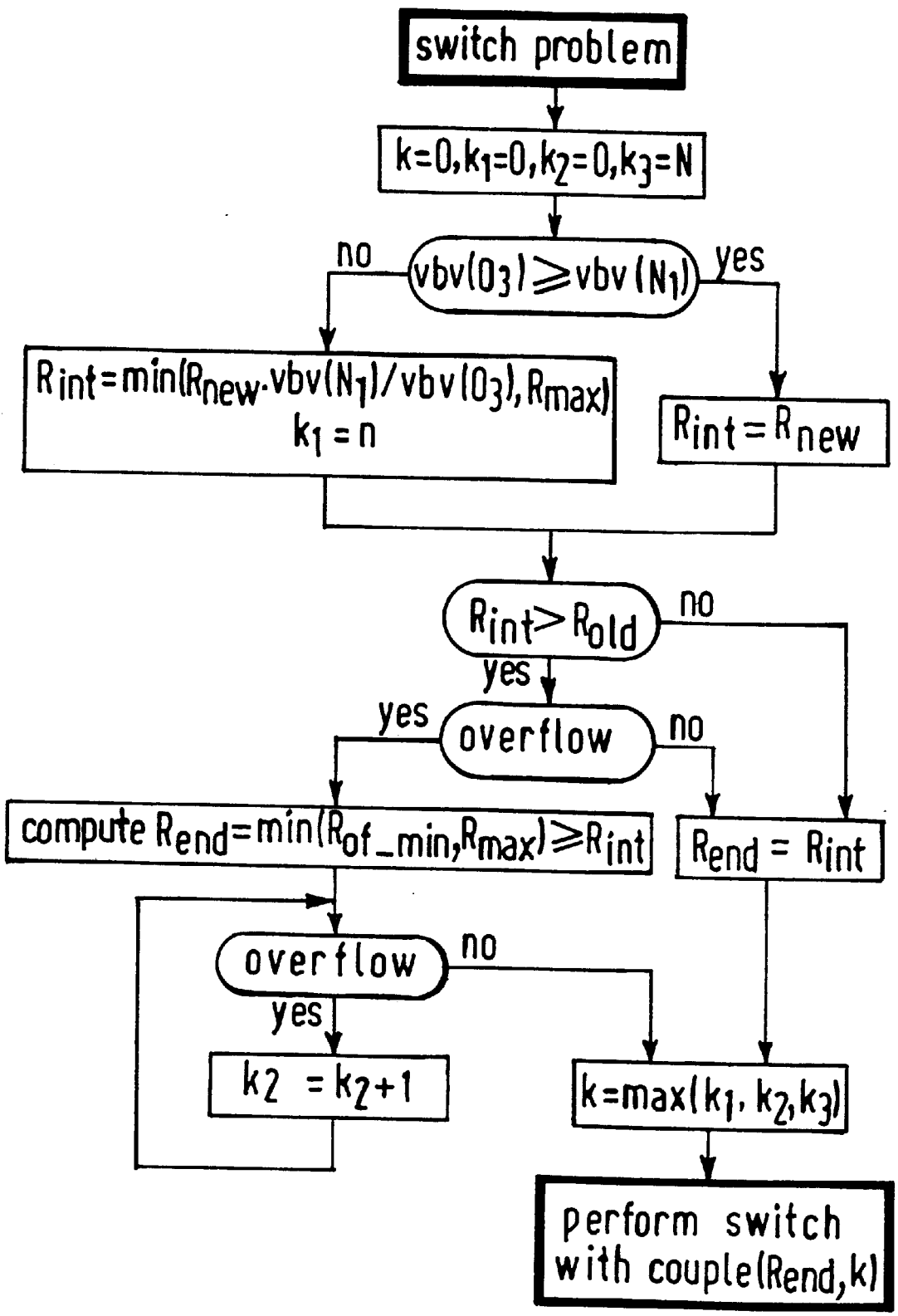

It should however be noted that, after having reduced the vbv_delay according to the present method, it is sometimes possible to be still in a situation where vbv_delays are not yet compatible. It is then possible to combine said method with a second one based on the insertion of so-called minimal pictures, as described in the european patent application n° 97401160.3 (PHF97557) previously filed on May 27, 1997. According to said document, the bit rate is no longer modified; instead, the new video sequence is delayed by a given number k of pictures, and k minimal pictures—i.e. pictures that are coded with a number of bits as low as possible and which stay compliant for the decoding process—are then inserted within the released space between the old and new sequences. The diagrams of FIGS. 13 and 14 illustrate the main steps carried out respectively in a device for implementing the local bit rate modification such as described and in a device for implementing the above-mentioned combination of methods. In FIG. 14, R(of_min) designates the minimal rate that guarantees no overflow.

What is claimed is:

1. A method for switching from a first coded picture sequence at a bit rate $R_{old}$ to a second coded picture sequence at a lower bit rate $R_{new}$ before decoding in a decoder provided with a buffer for receiving pictures to be decoded, the method comprising the steps of:

increasing the lower bit rate $R_{old}$ of a first transmitted picture ($N_1$) of the second coded picture sequence if a video buffering verifier delay vbv($N_1$) of the first transmitted picture ($N_1$) of the second coded picture sequence is greater than a video buffering verifier delay vbv($O_3$) of a first replaced picture($O_3$) of the first coded picture sequence.

2. A method according to claim 1, wherein in case of a limited bandwidth for the bit rates:

(a) the bit rate of said first transmitted picture ($N_1$) is increased up to a lower of the two following values: a maximum bit rate value corresponding to said limited bandwidth, or a value $R_{int}$ for which said period vbv ($N_1$) is correspondingly reduced to a value at most equal to the period vbv($O_3$);

(b) the operation (a) is repeated for a second picture ($N_2$) of the second sequence, only if said lower value is the maximum bit rate value corresponding to said limited bandwidth;

(c) the operation (a) is similarly repeated for additional pictures ($N_3$, $N_4$, ..., ) of the second sequence only if said lower value is said maximum bit rate value.

3. A method according to claim 2, wherein said maximum bit rate value $R_{int}$ is equal to said bit rate $R_{old}$ and said value $R_{int}$ is given by the following relation:

$$R_{int} = (\text{vbv}(N_1) \cdot R_{new})/\text{vbv}(O_3).$$

4. A device for switching according to the method as claimed in claim 1.

5. A device as claimed in claim 4, provided for combining said switching method to a second one where a sequence of pictures coded with a number of bits as low as possible is inserted between the first and second sequences.

* * * * *